US006975725B1

(12) United States Patent
Candelore et al.

(10) Patent No.: US 6,975,725 B1
(45) Date of Patent: Dec. 13, 2005

(54) METHOD FOR STANDARDIZING THE USE OF ISO 7816 SMART CARDS IN CONDITIONAL ACCESS SYSTEMS

(75) Inventors: Brant L. Candelore, Escondido, CA (US); William Tseng, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 787 days.

(21) Appl. No.: 09/688,375

(22) Filed: Oct. 10, 2000

Related U.S. Application Data

(60) Provisional application No. 60/197,147, filed on Apr. 14, 2000.

(51) Int. Cl.$^7$ ................................................. G06F 1/00

(52) U.S. Cl. ...................... 380/227; 380/227; 380/228; 380/30; 380/239; 713/167; 713/171; 713/182; 713/185; 713/189; 713/193; 713/202; 235/380; 235/492; 235/379; 705/50; 705/51

(58) Field of Search ............................... 380/227, 277, 380/228, 30, 239; 713/167, 171, 182, 185, 713/189, 193, 202; 235/380, 492, 379; 705/50, 705/51

(56) References Cited

U.S. PATENT DOCUMENTS 5,844,218 A    12/1998  Kawan et al.
6,040,851 A *   3/2000  Cheng et al. ................ 725/132

FOREIGN PATENT DOCUMENTS

WO    WO 00/16179    *  3/2000  ............ G06F 1/00

OTHER PUBLICATIONS

Microsoft, Smart Cards, 1999 http://www.microsoft.com/technet/treeview/default.asp?url=/technet/prodtechnol/windows2000serv/maintain/security/smtcard.asp.*
SCM Microsystems enables Microsoft Windows Smart Card-based Security Readers 'Designed for Windows NT and Windows 98', BusinessWire, New York, Feb. 16, 1999, p. 1.*
New Deal For Smart Cards, Machine Design, Jun. 11, 1993, downloaded from the internet Jun. 7, 2005.*
Approaches to Electronic Miniaturization, H. M. B. Bird, IEEE Transaction on Components, Packaging, and Manufacturing Technology, Part A, vol. 18, No. 2, Jun. 1995.*
"Detailed Overview of the PC Card Standard", http://www.pcmcia.org/pccardstandard.htm, Oct. 6, 2000, 1-10 pgs.
"OpenCable™ HOST-POD Interface Specification", IS-POD-131-WD01-991008, Oct. 8, 1999, © 1998 Cable Television Laboratories, Inc., 75 pgs.
Titre Francais ici, Hier Deutsche Ubeschrift, "Common Interface Specification for Conditional Access and Other Digital Video Broadcasting Decoder Applications", Apr. 1996 Draft D (Apr. 23, 1996), English Version, CENELEC, 91 pages.
"Conditional Access System for Terrestrial Broadcast", ATSC Standard, Advanced Television Systems Committee, Doc. A/70, Jul. 17, 1999, 30 pgs.

(Continued)

Primary Examiner—Emmanuel L. Moise
Assistant Examiner—Taghi T. Arani
(74) Attorney, Agent, or Firm—Blakely, Sokoloff, Taylor & Zafman LLP

(57) ABSTRACT

A conditional access system and method are disclosed allowing the use of a standard smart card. A computing resource configured to run the conditional access protocol has a smart card interface and a software wrapper configured to run on the computing resource coupling the smart card interface to the conditional access protocol.

9 Claims, 4 Drawing Sheets

OTHER PUBLICATIONS

"*Guidelines for Implementation and Use of the Common Interface for DVB Decoder Applications*", Date of Issue Apr. 12, 1996, Draft: E, 56 pgs.

Draft EIA-679-B (Part A), *Foreward*, 55 pgs.

Husemann, Dirk et al., OpenCard: Talking to Your Smart Card, IEEE, Jul. 1999, entire text.

* cited by examiner

METHOD FOR STANDARDIZING THE USE OF ISO 7816 SMART CARDS IN CONDITIONAL ACCESS SYSTEMS

CROSS-REFERENCE TO RELATED APPLICATION

This application claims the benefit of the filing date of the Provisional U.S. Patent Application entitled "METHOD FOR STANDARDIZING THE USE OF ISO 7816 SMART CARDS IN RECEIVERS PERFORMING CONDITIONAL ACCESS", application No. 60/197,147, filed Apr. 14, 2000.

FIELD OF THE INVENTION

The present invention pertains to the field of conditional access mechanisms. More particularly, the present invention relates to standardizing the use of ISO 7816 smart cards in conditional access systems.

BACKGROUND OF THE INVENTION

In applications, appliances, computer systems, or other systems where data and/or signals are scrambled, encrypted, or protected, there is often a control mechanism to allow the descrambling, decryption, or decoding of such data and/or signals. This control mechanism is often referred to as a conditional access (CA) system or module. The CA system may consist of several modules that perform functions. Some of the functions may be performed on a card which may be inserted into a system or slot. One common form factor is that of a smart card, another is Personal Computer Memory Card International Association (PCMCIA). Smart cards have several standards, one is International Organization for Standardization (ISO) 7816. Reference will be made to this specification as ISO 7816. PCMCIA cards have several standards, one is Type 2. Reference to a smart card is to be understood to refer to the ISO 7816 standard unless stated otherwise. Reference to a PCMCIA card is to be understood to refer to the PCMCIA Type 2 standard unless stated otherwise.

There are several standards for conditional access systems. In the U.S., one such standard is the National Renewable Security Standard (NRSS). The NRSS has defined two types of CA modules, a NRSS part A module (NRSS-A) with a smart card form factor, and NRSS Part B (NRSS-B) with a PCMCIA form factor. In the U.S., some other standards are OPENCABLE™ Host Point Of Deployment Interface Specification (POD), and Conditional Access System for Terrestrial Broadcast (ATSC-A70). In Europe, Digital Video Broadcasting (DVB) organization has defined a CA module similar to NRSS Part B called "Common Interface" (CI). For convenience, we shall refer to any CA protocols with smart card form factors (e.g., NRSS-A) as a "first" CA protocol and refer to CA protocols with PCMCIA form factors (e.g., NRSS-B) as a "second" CA protocol.

One of the challenges facing manufacturers building devices that have conditional access capability is that they want a standardized method for communicating to CA modules. NRSS Part A, which uses the smart card form factor, has technical implementation issues. NRSS part B modules, which are PCMCIA form factor, are expensive, and have some technical issues as well. Devices that may accept a CA module include, but are not limited to, televisions (TVs), video cassette recorders (VCRs), personal video recorders (PVRs), home jukebox players, set top boxes (STB) for terrestrial broadcast, cable, or satellite, etc. Manufacturers want the CA interface standardized so that the devices can be built in a generic way. The NRSS-A CA card is not a typical ISO 7816 smart card, and NRSS-A cards are not readily available.

A device (set top box, TV, VCR, etc.), which has both a CA interface for an ISO 7816 smart card, and a POD module typically has two separate interface protocols. Different CA protocols for different types of CA modules adds to the complexity of the device.

SUMMARY OF THE INVENTION

A conditional access system and method are disclosed allowing the use of a standard smart card. A computing resource configured to run the conditional access protocol has a smart card interface and a software wrapper configured to run on the computing resource coupling the smart card interface to the conditional access protocol.

BRIEF DESCRIPTION OF THE DRAWINGS

The present invention is illustrated by way of example and not limited by the figures of the accompanying drawings in which like references indicate similar elements and in which.

DETAILED DESCRIPTION

A method and apparatus for using a standard smart card in a conditional access system is described. References will be made to communications, links, pathways, etc., and it is to be understood that what these terms refer to is information being transferred. This information being transferred may be in the form of a signal, a series of signals, data, or streams of data. The actual mechanism for the transfer of the information is not critical to the description or understanding of the present invention and may take the form of wired, wireless, busses, optical, or other transmission medium.

Computing resources may be referred to as well as executing programs, coupling, and routing data and/or signals in software. What is to be understood is that a computing resource, such as a microprocessor, is executing a series of instructions, which are causing these operations to occur. For example, the routing of signals and/or data may consist of presenting computing results to a memory location, a stack, an electrical bus structure, etc.

Likewise, reference is made to application programming interfaces (API). It is to be understood that an API is one of several methods to gain access to computing resources. The API may consist of software, hardware, or a combination of hardware and software. For example, a software API may consist of a call routine. An API involving hardware may consist of an interrupt request.

Figure 1:
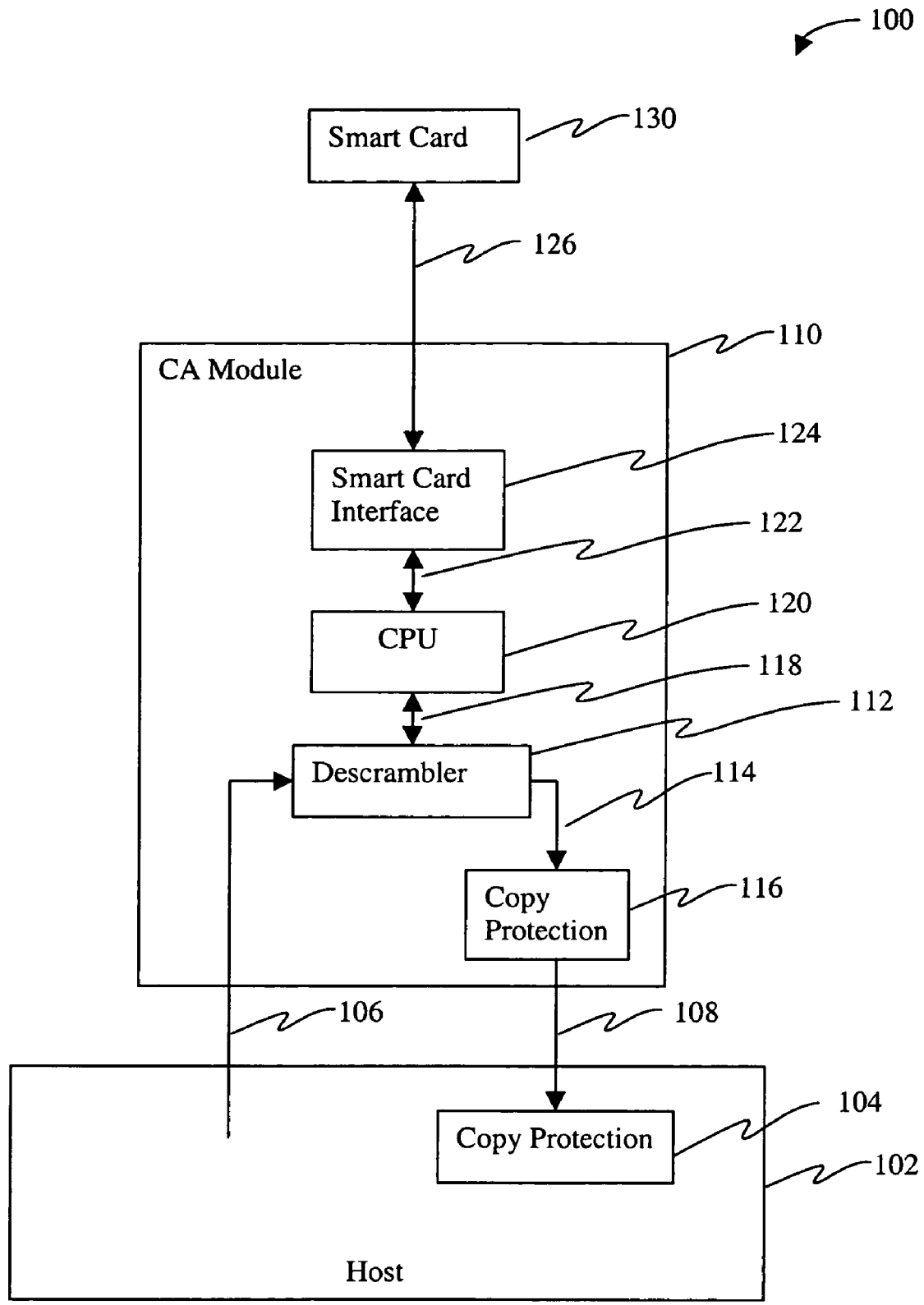
FIG. 1 is an illustration of a prior art conditional access system.

FIG. 1 is an illustration of a prior art conditional access system. In FIG. 1 the conditional access (CA) system 100 has three major blocks, a host 102, a CA module 110, and a smart card 130. Coming from the host 102 is a data stream 106, which may be scrambled. The data stream 106 enters a descrambler 112 in the CA module 110 and produces a descrambled output 114. The descrambled output 114 may then enter an optional copy protection 116 block and be sent as a copy protected stream 108 to the host 102 where it is received by a copy protection block 104 in the host 102. The copy protection 116 in the CA module 110 and the copy protection 104 in the host 102 are optional blocks. For example, at this time the DVB organization has not specified a copy protection method. Smart card 130 communicates with the CA module 110 via link 126 with a smart card interface 124. The smart card interface 124 communicates to the central processing unit (CPU) 120 via communication link 122. The CPU 120 interfaces with the descrambler 112 via pathway 118.

An example of an operational sequence would be the host 102 sending a scrambled data stream 106 to the descrambler 112. The descrambler 112 may then communicate via 112 to the CPU 120 a request for a CA code word required for the descrambler 112 to descramble the scrambled data stream 106. The CPU 120 may then communicate via link 122 the request to the smart card interface 124, which in turn communicates via link 126 with the smart card 130. The smart card 130 may then communicate back to the smart card interface 124 via link 126 the requested information. This information is then communicated via link 122 to the CPU 120 and then through pathway 118 to the descrambler 112, which then uses the information to descramble the signal. This descrambled signal 114 then may optionally pass through copy protection 116. The signal is then communicated from the CA module 110 through link 108 to the host 102 where it may optionally pass through a copy protection 104.

Figure 2:
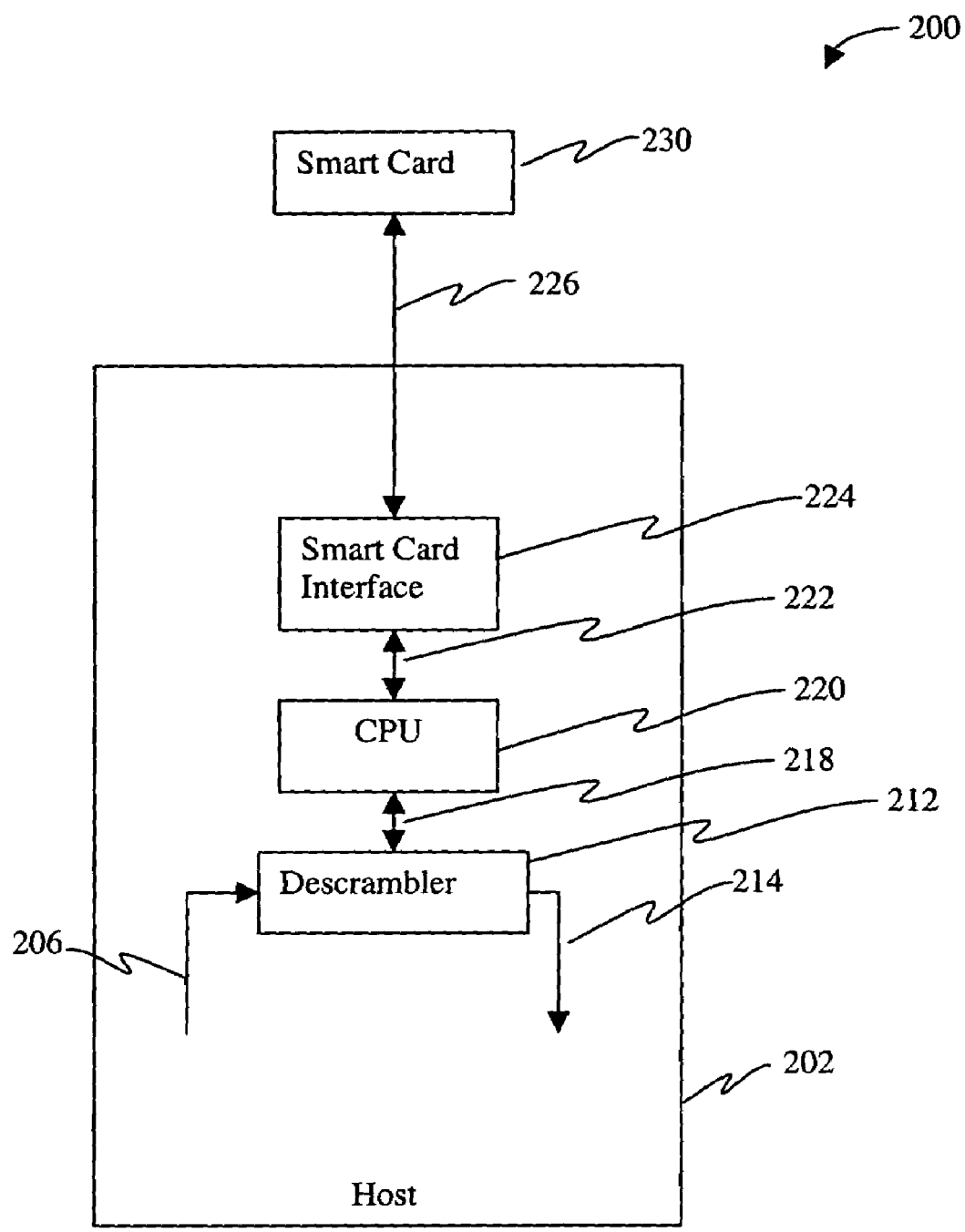
FIG. 2 illustrates a block diagram of one embodiment of the present invention.

FIG. 2 illustrates a block diagram of one embodiment of the present invention. In this embodiment, the CA system 200 has two major blocks, a host 202, and a smart card 230. The smart card 230 communicates via link 226 with the smart card interface 224. The smart card interface 224 communicates via link 222 with the CPU 220. The CPU 220 communicates via link 218 with the descrambler 212. The descrambler 212 may receive a scrambled data stream 206 and may descramble it providing a descrambled data stream 214.

As can be seen from the prior art as illustrated in FIG. 1 and one embodiment of the present invention as shown in FIG. 2, the functionality of the CA module 110 in FIG. 1 is being substantially performed by the host 202 in FIG. 2. Thus, for example, the descrambler function in the prior art, which was performed in a CA module 110, may in the present invention be performed substantially by the host 202. Thus, the host may be required to perform replacement functions for some of the functionality that the CA module 110 in the prior art performed.

Figure 3:
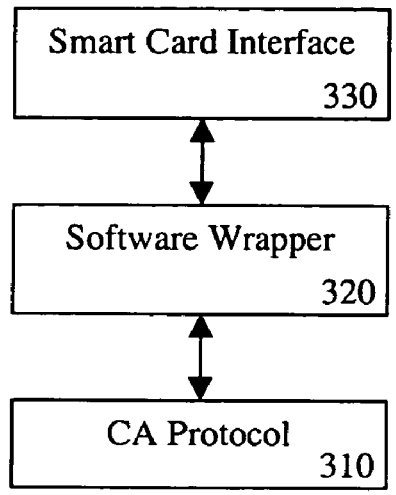
FIG. 3 illustrates another embodiment of the present invention.

FIG. 3 illustrates another embodiment of the present invention. An existing conditional access protocol 310 interfaces with a software wrapper 320 which interfaces to a smart card interface 330. The CA protocol 310, may be for example, an industry standard protocol conforming to a spec, such as the NRSS-B. The software wrapper 320 presents to the CA protocol 310 the proper signals and/or data such that the NRSS-B protocol is met. That is, the CA protocol 310 does not have to be modified to work with a smart card because the software wrapper 320 performs those functions that in combination with the smart card fully meet the CA protocol 310. The actual interface of the software wrapper 320 to the CA protocol 310 may, for example, be through an application programming interface (API) of the CA protocol 310. Functions that the software wrapper 320 may need to perform in order to allow the smart card interface 330 to operate and/or interface to the CA protocol 310, may for example include, but are not limited to such functions as demultiplexing of entitlement management mode (EMM) messages, entitlement control messages (ECM), service information (SI), etc. Additionally the software wrapper 320 may need to load descrambling keys into a descrambler.

It is to be understood that the specific implementation of the smart card interface 330, the software wrapper 320, and the CA protocol 310, may all be in software, hardware, or a combination of software and hardware. For example, the CA protocol 310, and software wrapper 320 may be software programs executing on a host's resources such as a CPU, memory, non-volatile storage, etc. The smart card interface 330, may for example, be implemented in hardware and may consist of something as simple as a receptacle for a smart card to plug into. The smart card may be more complicated and consist of, for example, a microprocessor based controller interfaced to a wireless transmitter and receiver for communication with a smart card.

Figure 4:
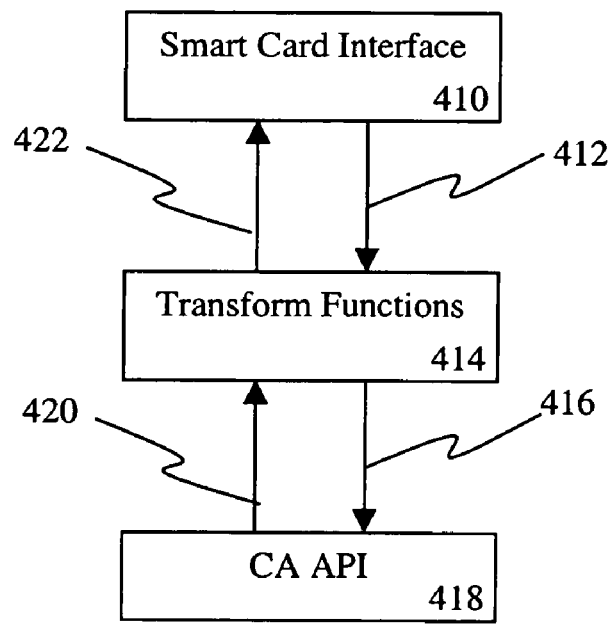
FIG. 4 illustrates signal flow in another embodiment of the present invention.

FIG. 4 illustrates signal flow in another embodiment. FIG. 4 illustrates transform functions 414 being used to interface a smart card interface 410 and a conditional access (CA) applications programming interface (API) 418. CA API 418 may issue information 420 in the form of signals and/or data that requires a response for the CA protocol to operate. The information 420 is received by the transform functions 414, which depending upon the response required may route the information to different destinations. In one instance the information 420 received by the transform functions 414 may be routed unaltered as information 422 to the smart card interface 410. Alternatively, information 420 received by the transform functions 414 may be routed after some transformation as information 422 to the smart card interface 410. In another instance the information 420 received by the transform functions 414 may be locally transformed to meet the CA API and then sent as information 416 to the CA API 418. In yet a third instance, there may be a combination of transformations being performed by the transform function 414, with some information 422 being sent the smart card interface 410, and other information being sent after local transformation as information 416 to the CA API 418.

Information 412 received from the smart card interface 410 by the transform functions 414 may likewise have several destinations. Information 412 received from the smart card interface 410 by the transform functions 414 may be passed straight through from transform functions 414 as information 416 to the CA API 418. Information 412 received from the smart card interface 410 by the transform functions 414 may be transformed locally by the transform functions 414 and used locally in combination with other transform results and then may be sent as information 416 to the CA API 418, or it may be transformed by transform functions 414 and then sent as information 416 to the CA API 418, or it may be sent unaltered as information 416 to the CA API 418, or it may be used locally by the transform functions 414 and not sent on, or a combination of these operations is possible.

The transformation of the information by transform functions 414 may be via software, hardware, or a combination of hardware and software. For example, a simple hardware transformation may be inverting the polarity of a signal received from the CA API 418. A simple software transformation may be reformatting a smart card status signal received from the smart card interface 410 into a format compatible with the CA API 418. Transform functions 414 therefore is to be understood to provide those transformation of information, signals, and/or data such that the transform functions 414 receives information 420 from and sends information 416 to the CA API 418 such that the CA API 418 needs no modifications to operate. Likewise, transform functions 414 is to be understood to provide those transformation of information, signals, and/or data such that the transform functions 414 sends information 422 to and receives information 412 from the smart card interface 410 such that the smart card interface 410 needs no modifications to operate.

Figure 5:
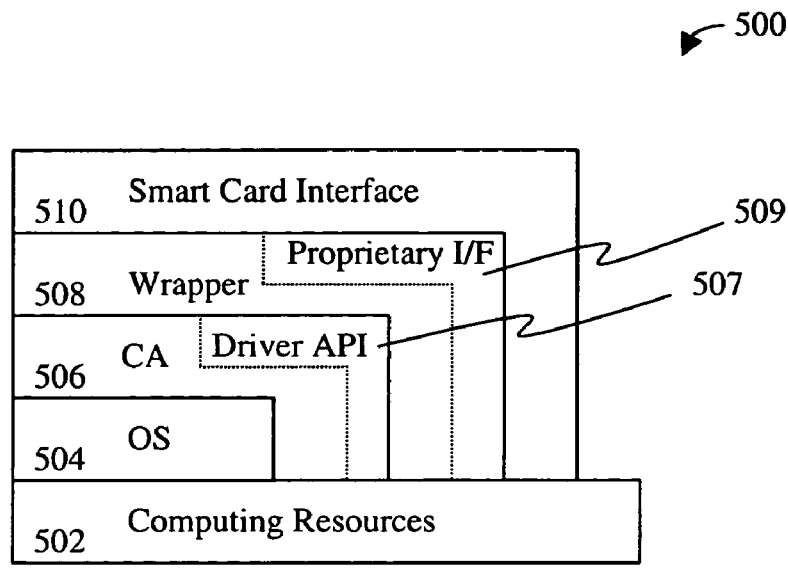
FIG. 5 illustrates resources in one possible embodiment of a conditional access system.

FIG. 5 illustrates resources in one possible embodiment of a conditional access system. In a CA system 500, computing resources 502 may consist of, but are not limited to, a CPU, memory, hardware, non-volatile storage, interfaces, etc. Operating system (OS) 504 may consist of, but is not limited to, a standard OS such as Unix, a custom OS, or a combination. Conditional access 506 may consist of, but is not limited to, a standard CA protocol such as NRSS, POD, ATSC-A70, CI, etc. The CA 506 may have a driver API 507 for interfacing. Such an interface, for example, may be a PCMCIA. Wrapper 508 may consist of hardware, software, or a combination of these. Proprietary interface (I/F) 509 may consist of, but is not limited to, legacy code, legacy support, special features, API's, etc. Smart card interface 510 may consist of, but is not limited to, hardware and/or software providing support and interfacing to an ISO 7816 smart card.

In the example of CA system 500 as shown in FIG. 5, resources such as OS 504, CA 506, driver API 507, wrapper 508, proprietary I/F 509, and smart card interface 510 that are in contact with each other have access to those resources. For example, the OS 504, CA 506, driver API 507, wrapper 508, proprietary I/F 509, and smart card interface 510 all have access to computing resources 502. Smart card interface 510 has access to computing resources 502, proprietary I/F 509, and wrapper 508.

In one embodiment of FIG. 5, for example, computing resources 502 may consist of a host computer in an OPENCABLE™ compliant set top box or television. The OS 504 may be a version of Linux. CA 506 may be OPENCABLE™ POD, and driver API 507 may be the PCMCIA API interfacing to OPENCABLE™ POD. Wrapper 508 may be software, proprietary I/F 509 may be legacy support for a smart card, and smart card interface 510 may be an interface to an ISO 7816 smart card.

Proprietary I/F 509 may, but is not limited to, providing support for a smart card interface 510 that is non-standard, or providing functional capabilities. That is, recall that some functions previously performed by a CA module separate from a host (see FIG. 1, CA module 110, and host 102) may now be performed by the host (see FIG. 2, host 202). Thus, the wrapper 508 by interfacing with the proprietary I/F 509 and the CA 506, may provide support for functions and/or non-standard interfaces to smart cards. For example, a manufacturer may have developed a system with a proprietary interface to a smart card, yet now wants to use a standard CA protocol. In such a situation, the best approach may be to use some or all of the originally designed functionality rather than totally redesigning the system. Wrapper 508 may provide the interfacing needed between the proprietary I/F 509 and the CA 506. That is, the manufacturer by using the present invention may couple their smart card proprietary interface to an industry standard conditional access protocol.

Figure 6:
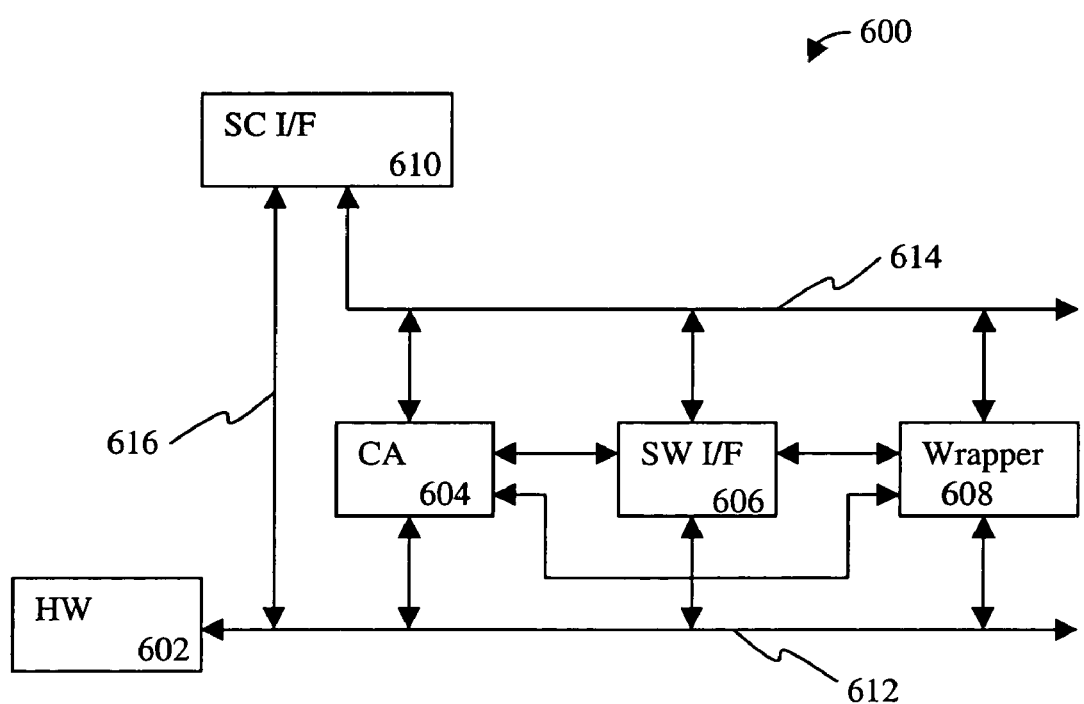
FIG. 6 illustrates information flow in another embodiment of a conditional access system.

FIG. 6 illustrates information flow in another embodiment of a conditional access system. FIG. 6 shows a CA system 600 indicating information, data, and/or signal flows denoted by arrows. Each block, by necessity for clarity, is a high level representation of the function and may include hardware and/or software. For example, hardware (HW) block 602 refers to computing resources such as a CPU, memory, storage, etc. HW 602 is capable of communicating directly with a conditional access (CA) 604 block, a software interface (SW I/F) 606 block, and a wrapper 608 via communication link 612. HW 602 is also capable of communication with smart card interface (SC I/F) 610 block via link 616. CA 604, SW I/F 606, and wrapper 608 can communicate with SC I/F via link 614. Additionally, CA 604, SW I/F 606, and wrapper 608 are connected to each other and may communicate with each other as indicated by the arrows showing such connection to each other.

While the above embodiment examples illustrate some possible configurations, it is to be understood that one practiced in the art may implement the functions in a variety of ways. For example, the transformation functions that enable a smart card to interface to an existing CA protocol may be implemented by dedicated proprietary software and/or hardware, or may be standardized as an API. These API's may be viewed as providing replacement functions that are necessary to interface between a standard smart card, such as an ISO 7816 smart card, and a standard CA protocol API, such as the NRSS-B PCMCIA API. The transformation functions may be also be implemented within an integrated circuit (IC), a processor or series of processors executing code, a dedicated controller or controllers, etc. Different CA protocols may be established in the future, which with the proper interfacing will allow the use of a smart card.

Likewise, it is to be understood that references to specifications or standards, such as NRSS-B, ISO 7816, etc., does not imply that the present invention requires a full and complete implementation of the entirety of a referenced specification or standard to be operable. For example, an ISO 7816 smart card interface is a smart card interface that complies substantially with ISO 7816 such that there is a minimum operable state of functionality allowing operation for the intended purpose or purposes.

Thus, a method and apparatus for allowing the use of a standard smart card in a conditional access system have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A conditional access (CA) system comprising:
   a computing resource implemented within a host, the computing resource configured to run a second conditional access (CA) protocol instead of a first CA protocol used for communication with a device operating as a smart card;
   a smart card interface being an interface for the host, the smart card interface adapted to receive and transfer signaling with the device; and a software wrapper implemented within the host, the software wrapper to transform information in a format compatible with the first CA protocol, the information comprises control information including entitlement management mode (EMM) messages, entitlement control messages and service information, into information in a format compatible with the second CA protocol, the second CA protocol operating to alter signaling from the device and received by the smart card interface as if a Personal Computer Memory Card International Association (PCMCIA) card provided such signaling.

2. The CA system of claim 1, wherein the second CA protocol is OpenCable™ Host Point Of Deployment Interface Specification (POD).

3. The CA system of claim 1, wherein the second CA protocol is selected from the group consisting of National Renewable Security Standard Part B (NRSS-B), OpenCable™ Host Point Of Deployment Interface Specification (POD), Common Interface Specification for Conditional Access and other Digital Video Broadcasting Decoder Applications (CI), and Conditional Access System for Terrestrial Broadcast (ATSC-A70).

4. The CA system of claim 1, wherein the software wrapper is configured to run on the computing resource.

5. A smart card interface comprising:
a smart card receptacle adapted for physically coupling to a smart card, the smart card receptacle to communicate smart card signals;
a Personal Computer Memory Card International Association (PCMCIA) Application Programming Interface (API); and
a software wrapper interfacing the smart card signals and the PCMCIA API, the software wrapper configured to transform information in a format compatible with the first CA protocol into information in a format compatible with a second CA protocol in order to alter signaling from the smart card and received by the smart card receptacle as if a Personal Computer Memory Card International Association (PCMCIA) card provided such signaling, the transformation includes demultiplexing entitlement management mode (EMM) messages, entitlement control messages or service information.

6. The smart card interface of claim 5, where the PCMCIA API is a conditional access (CA) API.

7. The smart card interface of claim 6, where the smart card signals are received from an ISO 7816 smart card.

8. A conditional access (CA) system comprising:
a first computing resource implemented within a host, the computing resource configured to execute a NRSS-B protocol;
an ISO 7816 smart card interface being an interface for the host, the ISO 7816 smart card interface adapted to communicate with a smart card physically coupled to the host; and
a software wrapper implemented within the host, the software wrapper configured to execute on a second computing resource implemented within the host to couple the ISO 7816 smart card interface to the NRSS-B protocol by alter signaling from the smart card and received by the smart card interface as if a Personal Computer Memory Card International Association (PCMCIA) card provided such signaling.

9. The system of claim 8 wherein the first computing resource and the second computing resource are a single microprocessor.

* * * * *